United States Patent
Snyder

(10) Patent No.: US 10,030,530 B2
(45) Date of Patent: Jul. 24, 2018

(54) REVERSIBLE BLADE ROTOR SEAL

(71) Applicant: United Technologies Corporation, Hartford, CT (US)

(72) Inventor: Daniel A. Snyder, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 282 days.

(21) Appl. No.: 14/804,894

(22) Filed: Jul. 21, 2015

(65) Prior Publication Data

US 2016/0032751 A1 Feb. 4, 2016

Related U.S. Application Data

(60) Provisional application No. 62/031,198, filed on Jul. 31, 2014.

(51) Int. Cl.
| | |
|---|---|
| *F01D 11/06* | (2006.01) |
| *F01D 11/00* | (2006.01) |
| *F01D 5/12* | (2006.01) |
| *F01D 5/30* | (2006.01) |
| *F01D 5/22* | (2006.01) |
| *F16J 15/08* | (2006.01) |

(52) U.S. Cl.
CPC .............. *F01D 11/006* (2013.01); *F01D 5/12* (2013.01); *F01D 5/22* (2013.01); *F01D 5/3007* (2013.01); *F16J 15/0887* (2013.01); *F05D 2220/32* (2013.01); *F05D 2240/30* (2013.01); *F05D 2240/55* (2013.01); *F05D 2250/22* (2013.01)

(58) Field of Classification Search
CPC . F01D 11/006; F01D 5/12; F01D 5/22; F01D 5/3007; F01D 11/008; F16J 15/0887; F05D 2220/32; F05D 2240/30; F05D 2240/55; F05D 2250/22; F05D 2240/80
USPC .................................. 416/190, 193 A, 500
See application file for complete search history.

(56) References Cited

U.S. PATENT DOCUMENTS

| | | | |
|---|---|---|---|
| 3,119,595 A | | 1/1964 | Wilson et al. |
| 3,266,770 A | * | 8/1966 | Harlow ................... F01D 5/081 416/174 |
| 3,709,631 A | | 1/1973 | Karstensen et al. |
| 4,088,421 A | * | 5/1978 | Hoeft ........................ F01D 5/22 416/145 |

(Continued)

FOREIGN PATENT DOCUMENTS

| | | |
|---|---|---|
| EP | 2762679 | 8/2014 |
| JP | H09303107 | 11/1997 |
| WO | 2015084449 | 6/2015 |

OTHER PUBLICATIONS

Partial European Search Report for European Application No. 15178896.5, dated Jan. 26, 2016.

(Continued)

*Primary Examiner* — Woody Lee, Jr.
*Assistant Examiner* — Brian Delrue
(74) *Attorney, Agent, or Firm* — Carlson, Gaskey & Olds, P.C.

(57) ABSTRACT

A rotatable sealing structure for a gas turbine engine includes a first blade and a second blade. A seal is arranged between the blades and has a body that is configured for operative association with the first and second blades in a first orientation and in a second orientation to seal a gap defined between the blades.

15 Claims, 3 Drawing Sheets

(56) References Cited

U.S. PATENT DOCUMENTS

| | | | | |
|---|---|---|---|---|
| 4,111,603 A * | 9/1978 | Stahl | ............... | F01D 5/3084 416/193 A |
| 4,659,285 A | 4/1987 | Kalogeros et al. | | |
| 4,872,812 A | 10/1989 | Hendley et al. | | |
| 4,878,811 A * | 11/1989 | Jorgensen | ............... | F01D 11/006 416/190 |
| 5,339,619 A | 8/1994 | Antonellis | | |
| 5,513,955 A * | 5/1996 | Barcza | ............... | F01D 11/006 416/193 A |
| 5,573,375 A * | 11/1996 | Barcza | ............... | F01D 11/008 416/190 |
| 5,827,047 A * | 10/1998 | Gonsor | ............... | F01D 5/22 416/193 A |
| 6,014,849 A * | 1/2000 | Yonemura | ............... | E03F 3/04 404/49 |
| 6,776,583 B1 * | 8/2004 | Wang | ............... | F01D 5/22 416/220 R |
| 6,857,639 B2 * | 2/2005 | Beeck | ............... | F16J 15/0887 277/637 |
| 7,121,800 B2 * | 10/2006 | Beattie | ............... | F01D 5/10 416/190 |
| 7,252,477 B2 | 8/2007 | Tomita et al. | | |
| 8,240,987 B2 * | 8/2012 | Spangler | ............... | F01D 11/006 415/115 |
| 8,876,478 B2 * | 11/2014 | Wassynger | ............... | F01D 5/24 415/119 |
| 2005/0179215 A1 | 8/2005 | Kono | | |
| 2006/0056974 A1 | 3/2006 | Beattie | | |
| 2006/0251508 A1 | 11/2006 | Norris et al. | | |
| 2009/0116953 A1 * | 5/2009 | Spangler | ............... | F01D 5/081 415/115 |
| 2014/0003950 A1 | 1/2014 | Beattie et al. | | |
| 2014/0052220 A1 | 2/2014 | Pedersen | | |
| 2014/0112786 A1 * | 4/2014 | Donnell | ............... | F01D 5/22 416/140 |
| 2014/0205429 A1 | 7/2014 | Harwell et al. | | |
| 2014/0271206 A1 * | 9/2014 | Marasco | ............... | F01D 11/006 416/193 A |
| 2015/0001815 A1 * | 1/2015 | Steiger | ............... | F01D 11/005 277/649 |
| 2015/0125301 A1 * | 5/2015 | Headland | ............... | F01D 5/082 416/174 |
| 2015/0226077 A1 * | 8/2015 | Beattie | ............... | F01D 5/26 416/174 |
| 2015/0330227 A1 * | 11/2015 | Propheter-Hinckley | .. | F01D 5/16 416/106 |
| 2016/0017716 A1 * | 1/2016 | Haggmark | ............... | F01D 11/006 415/208.1 |
| 2016/0047260 A1 * | 2/2016 | McCaffrey | ............... | F01D 11/006 416/223 A |
| 2016/0061048 A1 * | 3/2016 | Corcoran | ............... | F01D 11/006 416/171 |
| 2016/0084101 A1 * | 3/2016 | McCaffrey | ............... | F01D 5/225 415/173.3 |
| 2016/0194972 A1 * | 7/2016 | Snyder | ............... | F01D 11/006 416/244 A |
| 2016/0215640 A1 * | 7/2016 | Bergman | ............... | F16J 15/0887 |
| 2016/0298466 A1 * | 10/2016 | Snyder | ............... | F01D 5/22 |
| 2016/0326898 A1 * | 11/2016 | Mongillo, Jr. | ............... | F01D 11/006 |
| 2017/0167284 A1 * | 6/2017 | Bergman | ............... | F01D 11/005 |

OTHER PUBLICATIONS

The Extended European Search Report for European Application No. 15178896.5, dated Apr. 22, 2016.

* cited by examiner

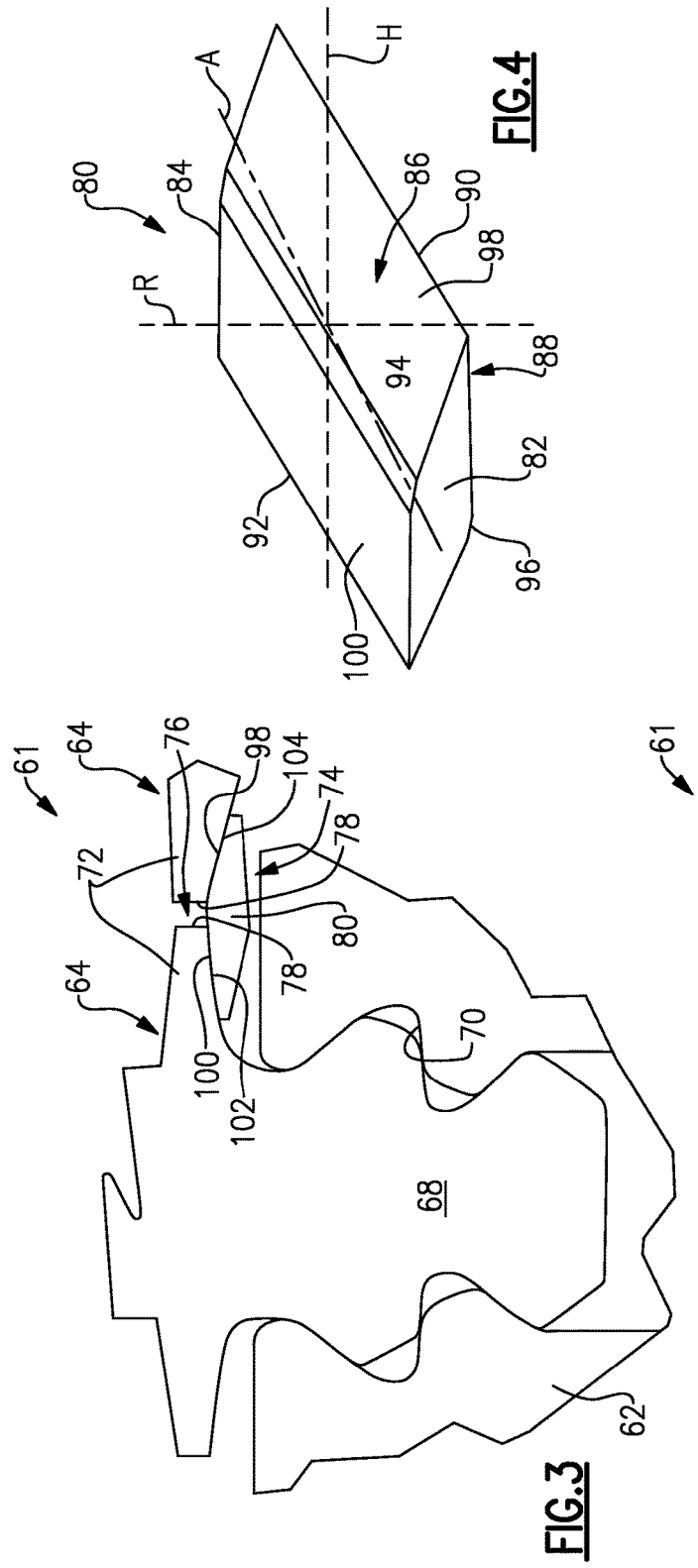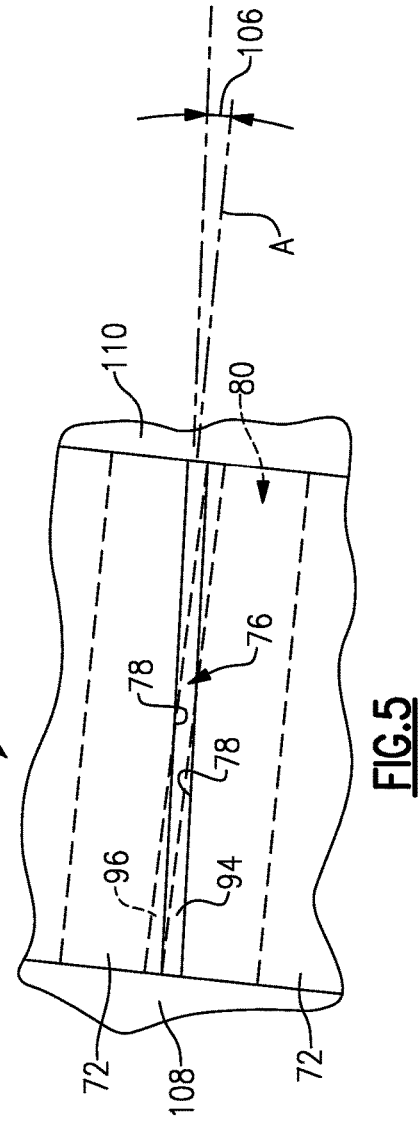

REVERSIBLE BLADE ROTOR SEAL

CROSS-REFERENCE TO RELATED APPLICATIONS

This application claims priority to U.S. Provisional Application No. 62/031,198, which was filed on Jul. 31, 2014 and is incorporated herein by reference.

STATEMENT REGARDING FEDERALLY SPONSORED RESEARCH OR DEVELOPMENT

This invention was made with government support under Contract No. FA8650-09-D-2923-0021, awarded by United States Air Force. The Government has certain rights in this invention.

BACKGROUND

This disclosure relates to seals used in turbine engines, and more particularly, to seals used with rotating parts within turbine engines.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Rotatable stages of the gas turbine engine, such as a turbine stage, typically include a circumferential array of blades secured to a rotor by a fir-tree type attachment. These attachments need to be kept cool from hot combustion gases in the gas flow path in order to provide sufficient strength to retain the turbine blades to the rotor throughout engine operation.

Seals can be utilized to help prevent hot gases from reaching the rotor, and thereby assist in maintaining sufficient rotor strength to the retain blades. Thus, there is a continuing need in the art for improved sealing capability, ease of installation, manufacturing tolerances, and longevity for seals used with rotating parts such as rotors.

SUMMARY

In one exemplary embodiment, a rotatable sealing structure for a gas turbine engine includes a first blade and a second blade. A seal is arranged between the blades and has a body that is configured for operative association with the first and second blades in a first orientation and in a second orientation to seal a gap defined between the blades.

In a further embodiment of the above, the blades each include a shelf. The seal is configured to engage the shelf.

In a further embodiment of any of the above, a rotor has slots that are each configured to receive a respective one of the first and second blades. The shelves define a gap therebetween. The seal is configured for engagement with the shelves between the shelves and the rotor to seal the gap.

In a further embodiment of any of the above, the seal extends in a generally axial direction that corresponds to the first axis and is canted relative to the first axis at an angle.

In a further embodiment of any of the above, the angle is between 0° and 20°.

In a further embodiment of any of the above, the seal includes first and second opposing ends spaced apart along the first axis. Each has a substantially parallelogram shape.

In a further embodiment of any of the above, the first and second opposing ends are parallel to one another.

In a further embodiment of any of the above, the seal includes first and second sides. Each includes tapered surfaces meeting at an apex.

In a further embodiment of any of the above, the apex is flat.

In a further embodiment of any of the above, in the first orientation, the first side faces the gap. In the second orientation, the second side faces the gap.

In a further embodiment of any of the above, the blades are turbine blades.

In a further embodiment of any of the above, a pocket between the first and second blades and a retainer is secured relative to the rotor over the pocket and is configured to maintain the seal within the pocket.

In another exemplary embodiment, a seal for a gas turbine engine rotatable stage includes a body that is reversible 180° about first, second and third axes that are orthogonal relative to one another such that the seal body is installable in four unique orientations.

In a further embodiment of the above, the seal extends in a generally axial direction and corresponds to the first axis. The seal is canted relative to the first axis at an angle.

In a further embodiment of any of the above, the angle is between 0° and 20°.

In a further embodiment of any of the above, the angle is between 5° to 10°.

In a further embodiment of any of the above, the seal includes first and second opposing ends spaced apart along the first axis and have a substantially parallelogram shape.

In a further embodiment of any of the above, the first and second opposing ends are parallel to one another.

In a further embodiment of any of the above, the body includes first and second sides each includes tapered surfaces meeting at an apex.

In a further embodiment of any of the above, the apex is flat.

BRIEF DESCRIPTION OF THE DRAWINGS

The disclosure can be further understood by reference to the following detailed description when considered in connection with the accompanying drawings wherein:

FIG. 3 is an enlarged cross-sectional view through a portion of a rotor and a blade root.

FIG. 4 is a perspective view of an example blade rotor seal in accordance with various embodiments.

FIG. 5 is a top elevational view of facing platforms of adjacent blades with the seal installed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
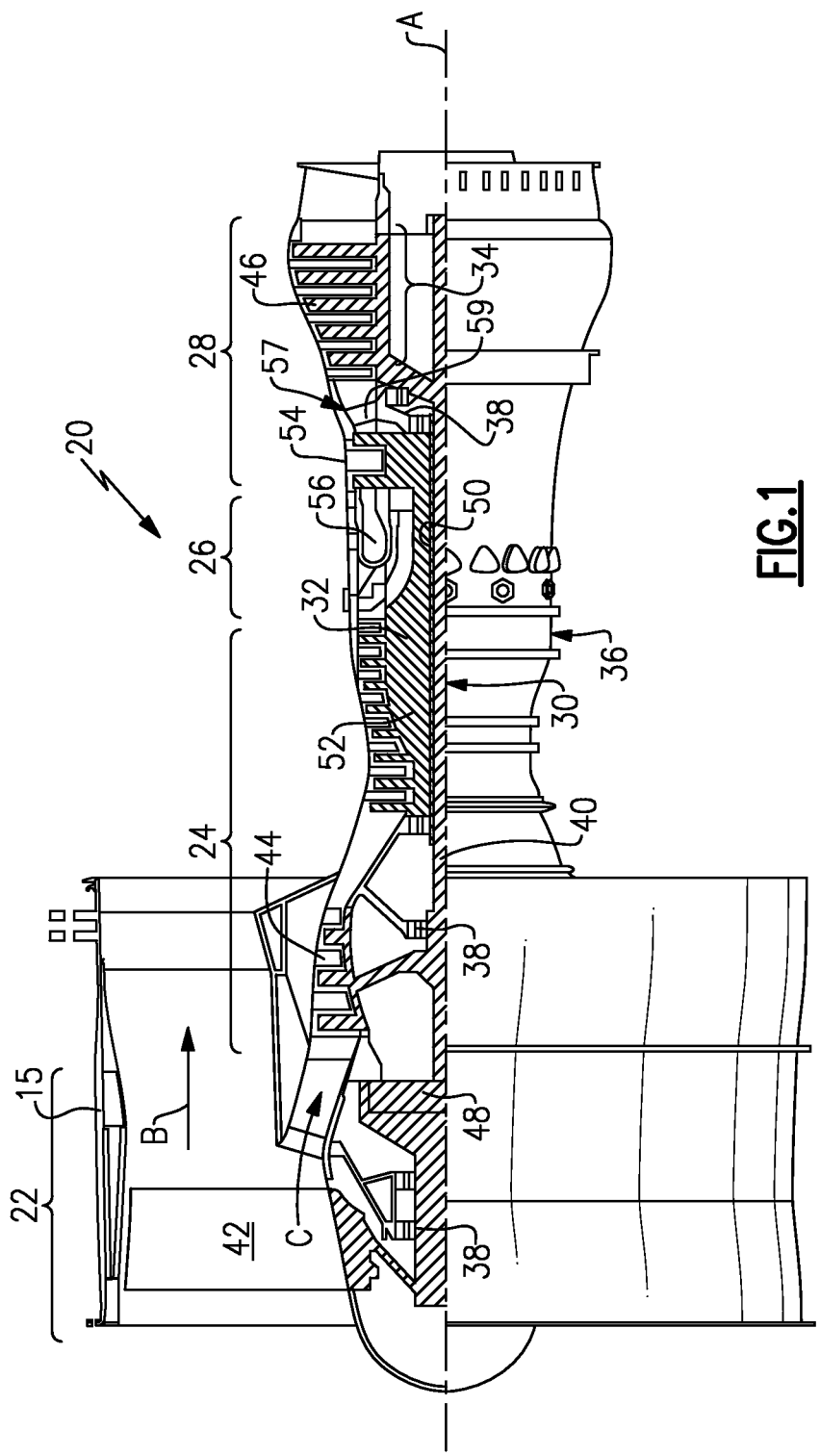
FIG. 1 schematically illustrates an exemplary gas turbine engine in accordance with various embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
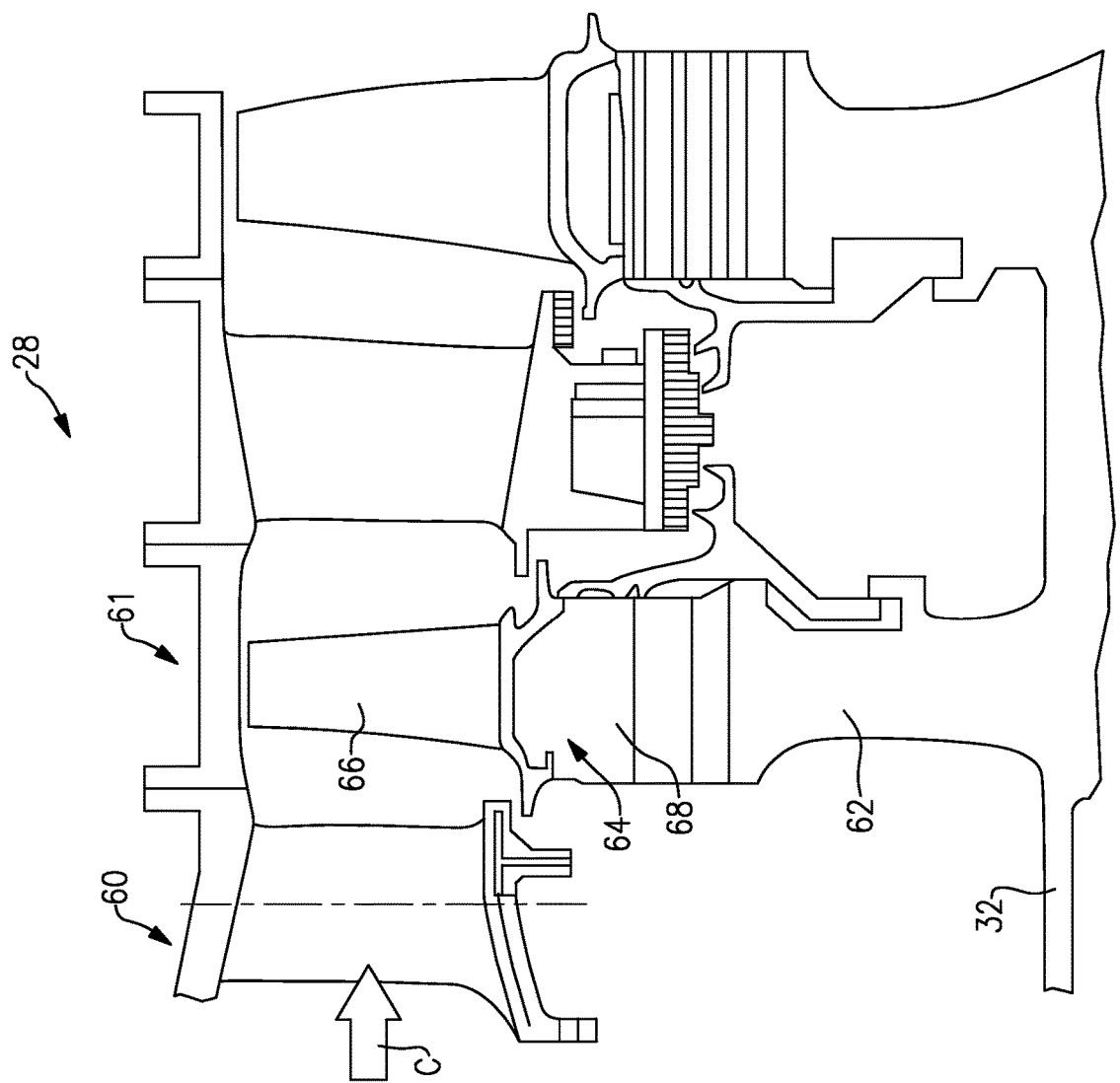
FIG. 2 is a cross-sectional view through a portion of an exemplary turbine section.

One example turbine section 28 is shown in FIG. 2. The turbine section 28 includes a fixed stage 60 and a rotating stage 61 that includes a rotor 62 mounted to the shaft 32. A circumferential array of blades 64 is secured to the rotor 62, a portion of which is shown in FIG. 3. An airfoil 66 is supported on one side of a shelf 72 that is mounted to a root 68, best shown in FIG. 3.

Referring to FIGS. 3-5, the rotor 62 includes a slot that receives the root 68. Platforms 72 of adjacent blades 64 define a pocket 74 between the adjacent shelf 72 and the rotor 62, and a gap 76 between circumferential opposed faces 78 of the shelf 72. It is desirable to prevent hot combustion gases from the core flow path C from entering the pocket 74. To this end, a seal 80 in accordance with the present disclosure is arranged in the pocket 74 and configured to engage the blades 64 to help seal the gap 76 by blocking hot combustion gases from travelling through the gap 76 to the rotor 62. Although seal 80 is illustrated as being used in a turbine section, it will be understood that seal 80 may additionally or alternatively be used in other sections of a turbine engine (e.g., engine 20), such as, for example, compressor section 24. Seals 80 can be arranged loosely in their respective pockets 74. Upon rotation of the rotor 62 about engine axis A, the seals 80 are forced radially outward under centrifugal loads to engage shelves 102, 104 (which are radially inward of the shelf 72) to obstruct the gap 76.

Lateral faces 98, 100 of the seal 80 engage the shelves 104, 102, respectively, as will be discussed in more detail with respect to FIG. 4 below. Contact between the seal 80 and shelves 102, 104 is configured to be greater at the front (fore with respect to the engine 20) side than at the rear (aft with respect to the engine 20) side of the rotor 62 in order to block the leak path of the core gases in the core flowpath C through the gap 76, which is primarily at the front side of the rotor 62. Additionally, cooling air moves along between the seal 80 and the rotor 62 and escapes at the aft side, thus blocking the hot gases of the core flow C from reaching the rotor 62 at the aft side. The seal 80 can be rigid such that it does not deform during operation of the engine 20. In one example, the seal 80 can be made of a nickel alloy, a cobalt alloy, or gamma titanium aluminide.

Referring to FIG. 4, the seal body 80 is asymmetrical. The body 80 is configured for installation and operation in four orientations, each presenting the same structural orientation, arrived at by rotation 180° about any of the first, second and third axes A, R, H, which are orthogonal relative to one another.

Referring to FIG. 4, the seal body 80 is configured for installation and operation in four orientations, each presenting the same structural orientation, arrived at by rotation 180° about any of the first, second and third axes A, R, H, which are orthogonal relative to one another.

The seal 80 includes first and second opposing sides 86, 88. One of the sides engages the shelf 72, and the other side faces the pocket 74 The first side 86 includes the lateral faces 98, 100 that are angled to meet at an apex 94, which is flat in one example. Lateral faces 98, 100 are substantially trapezoidal in shape. The second side 88 is configured in a similar manner to provide a second apex 96. In the example shown, best seen in FIG. 5, the apex 94 is canted at an angle 106 relative to the engine axis A. In one example, the angle 106 is between 0° and 20°. In another example, the angle is between 5° and 10°. The angle 106 is provided to accommodate the circumferential faces 78, which may be at an angle relative to the engine axis A for assembly of the blade 64 into the rotor 62.

In the example of FIGS. 3-5, the seal 80 is arranged in a first orientation in which the first side 86 engages the shelves 102, 104 and the second side 88 faces the pocket 74. The seal 80 can be rotated 180° about the first axis A, for instance, to arrive at a second orientation in which the second side 88 engages the shelves 102, 104 and the first side 86 faces the pocket. The geometry of seal 80 ensures that the seal can be inserted into the pocket 74 in any orientation, mistake-proofing assembly of the seals 80 into the rotatable stage 61.

The rotating stage may include forward and/or aft retainers or covers 108, 110 to seal the axial ends of the pocket 74, as best shown in FIG. 5.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A rotatable sealing structure for a gas turbine engine, comprising:
   a first blade having a first shelf;
   a second blade including a second shelf; and
   a seal including:
   a first side and a second side, each including tapered surfaces meeting at a first apex on the first side and a second apex on the second side,
   the seal is arranged between the blades and has a body that is configured for operative association with the first and second blades in either of a first orientation and a second orientation to seal a gap defined between the blades,
   the first and second sides are configured to engage the shelves respectively in the first and second orientations and present a structural orientation that is the same as one another,
   the seal has first, second and third axes that are orthogonal relative to one another, the first axis is a longitudinal axis, the second axis is a radial axis and the third axis is a circumferential axis,
   the first apex is canted at an angle relative to the first axis,
   the second apex is canted at an angle relative to the first axis such that when the seal is rotated 180° about one of the first, second, or third axes, the canted angle of the second apex is the same as the canted angle of the first apex.

2. The rotatable sealing structure according to claim 1, further comprising a rotor having slots, each configured to receive a respective one of the first and second blades, wherein the shelves define a gap therebetween, and wherein the seal is configured for engagement with the shelves between the shelves and the rotor to seal the gap.

3. The rotatable sealing structure according to claim 1, wherein the angles are between 0° and 20°.

4. The rotatable sealing structure according to claim 1, wherein the seal includes first and second opposing ends spaced apart along the first axis, each having a substantially parallelogram shape.

5. The rotatable sealing, structure according to claim 4, wherein the first and second opposing ends are parallel to one another.

6. The rotatable sealing structure according to claim 1, wherein the first and second apexes are flat.

7. The rotatable sealing structure according to claim 1, wherein in the first orientation, the first side faces the gap, and in the second orientation, the second side faces the gap.

8. The rotatable sealing structure according to claim 1, wherein the blades are turbine blades.

9. The rotatable sealing structure according to claim 1, further comprising a pocket between the first and second blades and a retainer secured relative to the rotor over the pocket and configured to maintain the seal within the pocket.

10. A seal for a gas turbine engine rotatable stage, the seal comprising:
   a body having a first side and a second side, that is reversible 180° about first, second and third axes that are orthogonal relative to one another such that the seal body is installable in four unique orientations,
   the first axis is a longitudinal seal axis, the second axis is a radial axis and the third axis is a circumferential axis,
   the first side and the second side of the body each includes tapered surfaces meeting at a first apex on the first side and a second apex on the second side,
   the first apex is canted at an angle relative to the first axis, and
   the second apex is canted at an angle relative to the first axis such that the body has first and second orientations that present a structural orientation that is the same as one another when the seal rotated 180° about the first, second and third axes.

11. The seal according to claim 10, wherein the angles are between 0° and 20°.

12. The seal according to claim 11, wherein the angles are between 5° to 10°.

13. The seal according to claim 10, wherein the body includes first and second opposing ends spaced apart along the first axis and having a substantially parallelogram shape.

14. The seal according to claim 13, wherein the first and second opposing ends are parallel to one another.

15. The seal according to claim 10, wherein the first and second apexes are flat.

* * * * *